United States Patent [19]
Buisson et al.

[11] Patent Number: 5,995,358
[45] Date of Patent: Nov. 30, 1999

[54] DEMAGNETIZABLE ELECTROPERMANENT MAGNETIC HOLDER

[75] Inventors: Fernand Buisson, Francin-Montmelian; Pierre Doyelle; Delphin Sibue, both of Montmelian, all of France

[73] Assignee: Parc D'Activites De La Grande Ile, Saint Helene Du Lac, France

[21] Appl. No.: 08/939,269

[22] Filed: Sep. 29, 1997

[30] Foreign Application Priority Data

Oct. 1, 1996 [FR] France .................................. 96 12158

[51] Int. Cl.⁶ .................................................. H01F 13/00
[52] U.S. Cl. .......................................... 361/267; 361/149
[58] Field of Search ..................................... 361/144, 145, 361/149, 267, 150, 151

[56] References Cited

U.S. PATENT DOCUMENTS

| | | | |
|---|---|---|---|
| 2,632,035 | 3/1953 | Jaeger | 361/149 |
| 3,086,148 | 4/1963 | Soneki | 361/149 |
| 4,218,722 | 8/1980 | Yoshizawa | 361/151 |
| 4,370,693 | 1/1983 | McDonald et al. | 361/149 |
| 4,462,059 | 7/1984 | Yamagami et al. | 361/149 |

FOREIGN PATENT DOCUMENTS

| | | | |
|---|---|---|---|
| 60-134585A | 7/1985 | Japan | 361/150 |
| 1164786 | 9/1969 | United Kingdom | 361/150 |

OTHER PUBLICATIONS

Degaussing electromagnetic articles by the phase control of AC power, J. Reed, Western Electric Technical Digest No. 33, Jan. 1974.

*Primary Examiner*—Fritz Fleming
*Attorney, Agent, or Firm*—Herbert Dubno; Andrew Wilford

[57] ABSTRACT

A holder having at least one magnetizable body surrounded by a coil is demagnetized by passing through the coil a succession of groups of pulses. The pulses of each group are of the same polarity and the polarity of each group of pulses is opposite that of the preceding group while the current of the pulses of each group is less than that of the pulses of the preceding group. Each group has 2 to 8 identical pulses and the pulses are formed by clipping an incoming alternating-current line voltage.

10 Claims, 6 Drawing Sheets

DEMAGNETIZABLE ELECTROPERMANENT MAGNETIC HOLDER

FIELD OF THE INVENTION

The present invention relates to an electropermanent magnetic holder. More particularly this invention concerns such a holder and a method of magnetizing and demagnetizing it.

BACKGROUND OF THE INVENTION

A permanent-magnet holding plate or mandrel is known for use in a machine shop to hold a workpiece while it is being machined. Such a holding plate can be set up so that it can be permanently magnetized and so that it can also be thoroughly demagnetized. Thus the holder is magnetized before or after a workpiece is positioned on it, and after the machining operation it is demagnetized to allow the finished workpiece to be separated from the holder.

More specifically such a magnet plate has high-induction magnets with a weak coercive field, typically aluminum-nickel-cobalt compounds that are surrounded by electrical coils and capped by ferrous pole pieces. Such a plate is activated so that it can magnetically hold a workpiece by passing an electrical current through the coils to permanently magnetize the magnets. During the machining operation the permanent magnetization serves to hold the workpiece in place. Once the machining operation is completed a current is passed through the coils so as to demagnetize the magnets, allowing the workpiece to be separated from the holder.

A first type of such electropermanent magnetic plate has the array of magnets covered by a pole plate and each magnet is surrounded by a respective coil of enamel-coated copper wire of very fine gauge and having a great number of turns. It takes between 0.8 sec and 1.0 sec of energization of the coils by direct current of a predetermined polarity to magnetize the magnets. Demagnetization is effected by passing about a dozen pulses of oppositely polarized current through the magnets over about 10 sec.

Such a system is very expensive, principally because in addition to the pole plate which costs about 30% of the total cost of the unit the coils are expensive. In addition here the bobbins are sealed underneath the pole plate.

In another known type of such a permanent-magnet holder each magnet is surrounded by a simple coil comprising only a few—six to ten —turns of copper wire with PVC insulation, the individual wires having a section between 1.5 and 6 $mm^2$. Such magnets are magnetized and discharged by currents obtained by discharging banks of condensers in about 3 to 5 millisec at a current of about 500 amp which is about the maximum one can get from the condensers.

While this type of magnetic holder is itself fairly cheap to manufacture, the supply circuit is relatively expensive principally because of the condensers. In addition such an arrangement is slow, taking 20 to 30 sec to demagnetize the holder, a time that is unacceptably long in today's rapid industrial processes.

It has been suggested to try to combine the best of these two types of holders by eliminating the pole plate in a system with fine-wire coils. The coils are potted in epoxy to protect them. The power supply for such a system is simple and inexpensive, and magnetization and demagnetization are relatively quick.

More particularly in this hybrid system the feed circuit comprises thyristors which are fed alternating line current and which are tripped so that they feed to the magnets three pulses of the same sign for magnetization. For demagnetization the thyristors are set to operate degressively and send positive and negative pulses through the coils.

While the feed circuit is fairly simple, making the holding plate is quite difficult. The fine-wire coils are expensive to produce as is the potting since the surfaces of the pieces must be abraded so the potting will adhere. The potting itself is normally done under vacuum so it is an expensive procedure. In addition several feed circuits must be provided for a large-area holding plate.

OBJECTS OF THE INVENTION

It is therefore an object of the present invention to provide an improved magnetizable and demagnetizable permanent-magnet holder.

Another object is the provision of such an improved magnetizable and demagnetizable permanent-magnet holder which overcomes the above-given disadvantages, that is which is simple and inexpensive to manufacture and operate.

A further object is to provide an improved method for operating such a magnetic holder.

SUMMARY OF THE INVENTION

A holder having at least one magnetizable body surrounded by a coil is demagnetized according to the invention by passing through the coil a succession of groups of pulses. The pulses of each group are of the same polarity and the polarity of each group of pulses is opposite that of the preceding group while the current of the pulses of each group is less than that of the pulses of the preceding group. Each group has 2 to 8 identical pulses and the pulses are formed by clipping an incoming alternating-current line voltage.

The coils can be of simple construction, of plastic-coated wire each with a few turns. The supply circuit does not need any condensers so it can be fairly inexpensive too. With this arrangement the demagnetization can be effected fairly quickly since relatively high current levels can be used on the coils, not the low amperages necessary for high-resistance fine-wire coils. Using pulses rather than a continuous direct current for magnetization and demagnetization greatly enhances the magnetization and demagnetization effect.

More particularly according to the invention the pulses succeed each other at a frequency equal to a frequency of the incoming alternating-current line voltage. Alternately the pulses can succeed each other at a frequency equal to a frequency of the incoming alternating-current line voltage divided by a whole number greater than 1. Similarly a spacing between succeeding pulse groups is equal to a whole-number multiple of a period of the incoming alternating-current line voltage.

The current of the pulse groups according to the invention decreases regularly, either as a linear or parabolic function. Thus regardless of how much magnetism has been imparted to the body or bodies, the demagnetization can be set to totally demagnetize it or them.

In accordance with the invention the body can be remagnetized by passing through the coil a series of pulses of the same current and polarity. More specifically according to the invention a workpiece is held during machining with a holder having a plurality of magnetizable bodies each surrounded by a respective coil. The body is first magnetized by passing through the coil a series of electric pulses of the same current and polarity and setting the workpiece on the body and the workpiece is thereafter retained on the body by means of the magnetism imparted to the body by the series of pulses. Thereafter the body is demagnetized as described above and the workpiece is separated from the demagnetized body.

A holding system energizable by alternating-current line voltage has according to the invention a plurality of magnetizable bodies, respective low-resistance coils surrounding the bodies, and a supply circuit including a pair of oppositely connected thyristors receiving the line voltage, connected to the coils, and having respective control gates. A controller is connected to the gates for passing through the coil a succession of groups of pulses as described above. Furthermore this holding system has according to the invention a ferromagnetic plate carrying a plurality of the bodies each with its own such coil, each body being formed by a permanently magnetizable aluminum-nickel-cobalt element and a ferromagnetic pole piece, and a plurality of ferromagnetic elements between the bodies and forming with the pole pieces a support surface.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
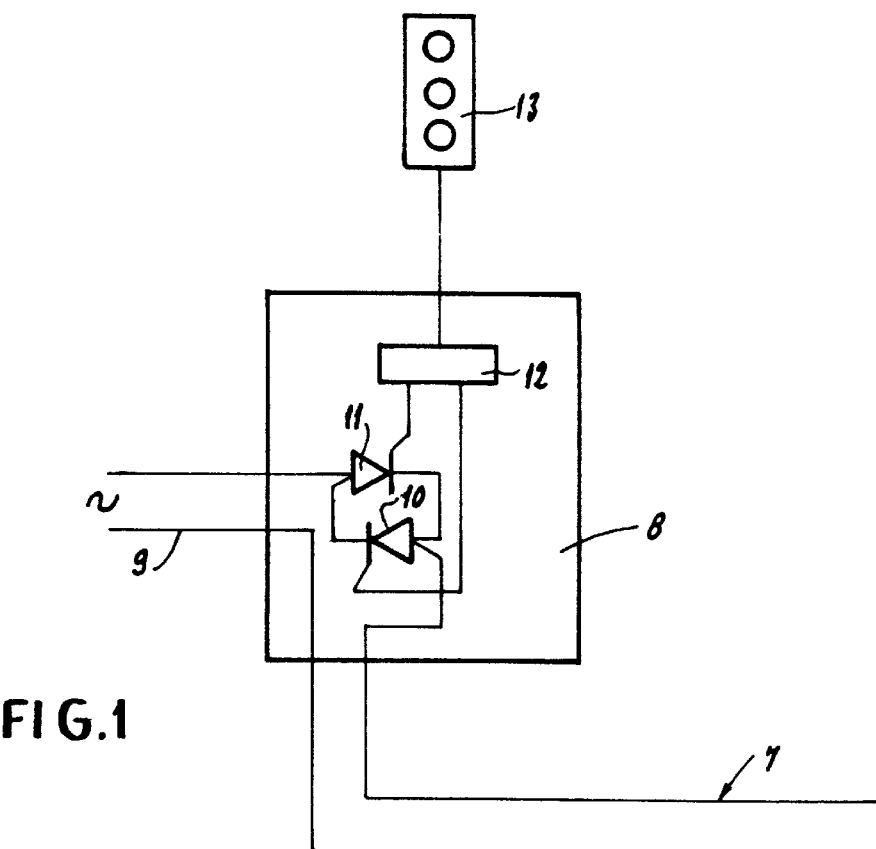
FIG. 1 is a diagrammatic view illustrating the holder system of this invention.

As seen in FIG. 1 an electropermanent magnetic plate 1 that can be totally demagnetized is used to hold a magnetically attractable workpiece 2, for example as it is being machined. The ferromagnetic plate 1 here has a plurality of aluminum-nickel-cobalt magnets 6 each surrounded by a low-resistance winding or coil 4 and capped by ferrous pole pieces 5 that upwardly extend them. Ferromagnetic elements 3 connected to the plate 1 form magnetic poles opposite those of the pole pieces 5 so that the upper surface of the plate 1 is formed by alternating north and south poles. There is no pole plate on the plate 1 so that the workpiece 2 sits directly on the pole pieces 5 and elements 3. Conductors 7 connect all the coils 4 in series with a feed or supply circuit 8 that serves to magnetize and demagnetize the magnets 6. The feed circuit 8 is itself supplied power from an alternating-current line 9.

The feed circuit 8 has two oppositely connected thyristors 10 and 11 through which the line current from the supply 9 passes to the feed lines 7. The gates of these thyristors 10 and 11 are connected to an internal control circuit 12 that itself is operated from an outside controller or input device 13. Normally all the input device 13 need do is output a start signal to initiate a magnetization of the magnets 6 and a stop signal to demagnetize them.

Figure 2:
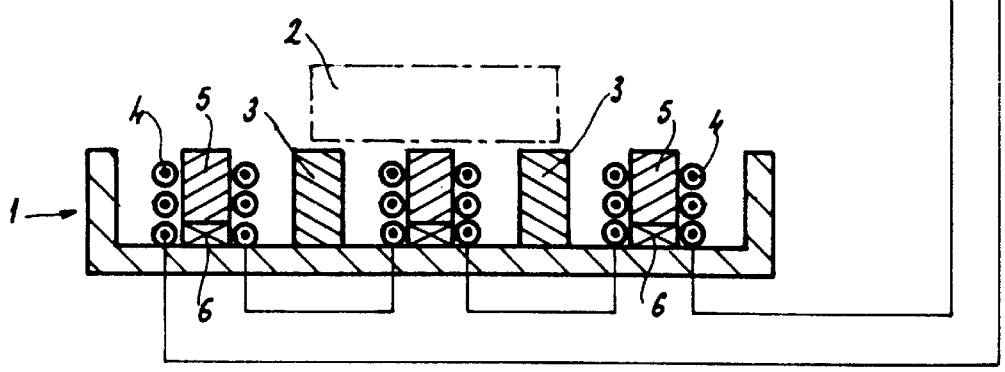
FIG. 2 is a pulse diagram illustrating the method of this invention.
Figure 2:
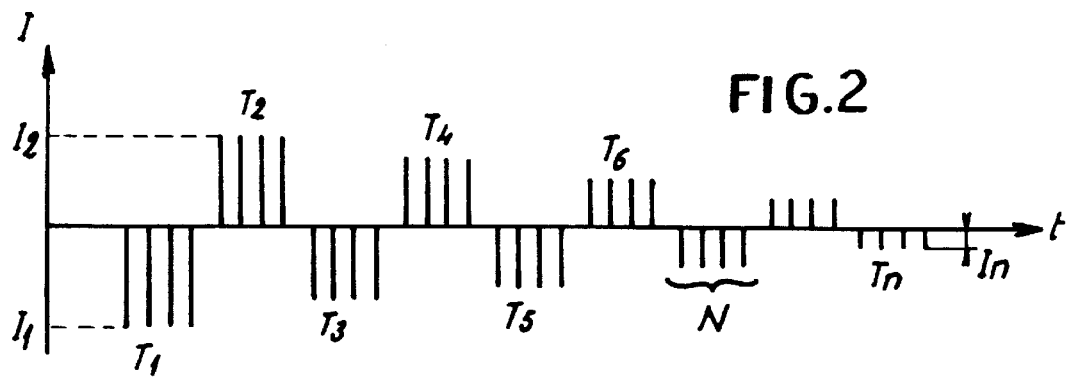

FIG. 2 shows how the demagnetization operation takes place. Here the abscissa shows time t and the ordinate current I. Each vertical line represents a single very short current pulse that is fed through the line 7 to the coils 4. Thus to demagnetize respective groups T1, T2 . . . Tn of pulses with respective decreasing current levels I1, I2 . . . In are fed through the coils 4, normally a total of ten to twenty such pulse groups with each succeeding group being of slightly less current than and of a polarity opposite that of the preceding one. Each pulse group has N pulses, normally three or four, and all the pulses of each group are of the same polarity and amperage. The decrease in current I can be linear or parabolic.

Figure 3:
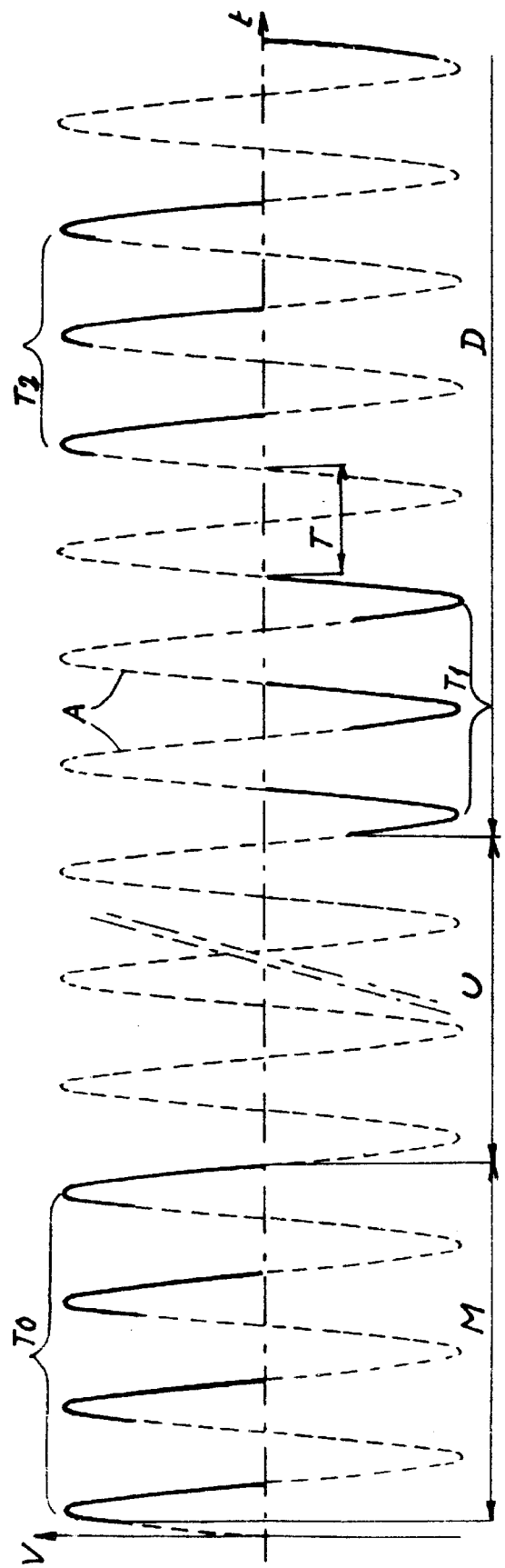
FIG. 3 shows the curve for the electrical voltage applied to the coils of the magnetic holder in order to magnetize it and at the start of the demagnetization
Figure 4:
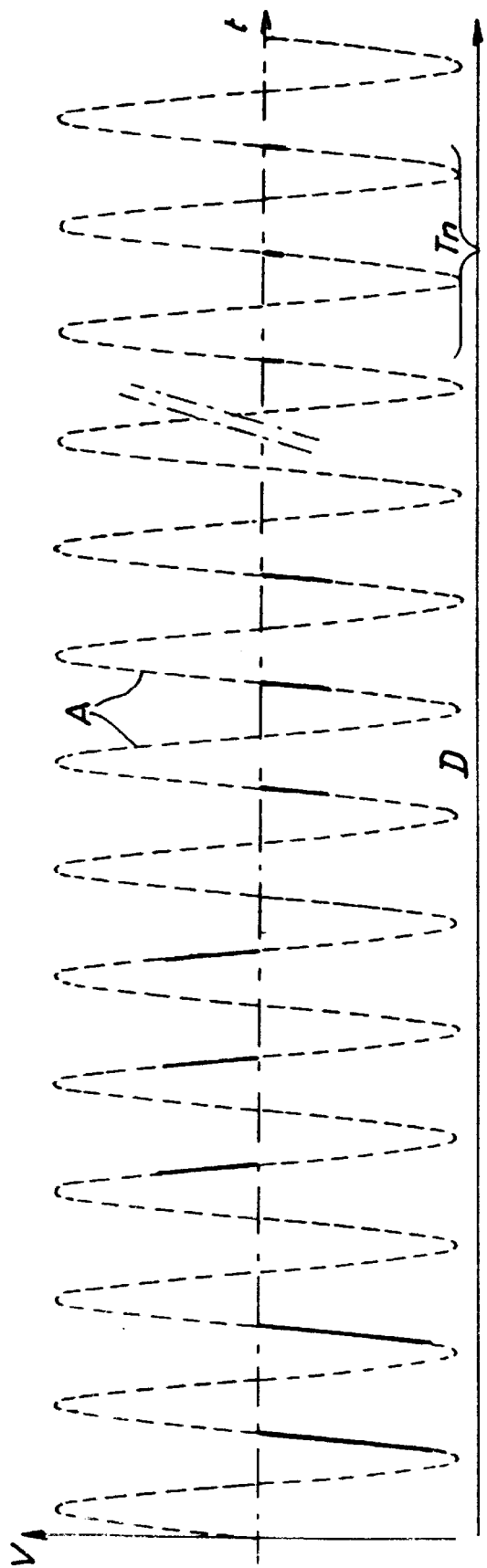
FIG. 4 shows the same curve as FIG. 3, but at the end of the demagnetization.
Figure 5:
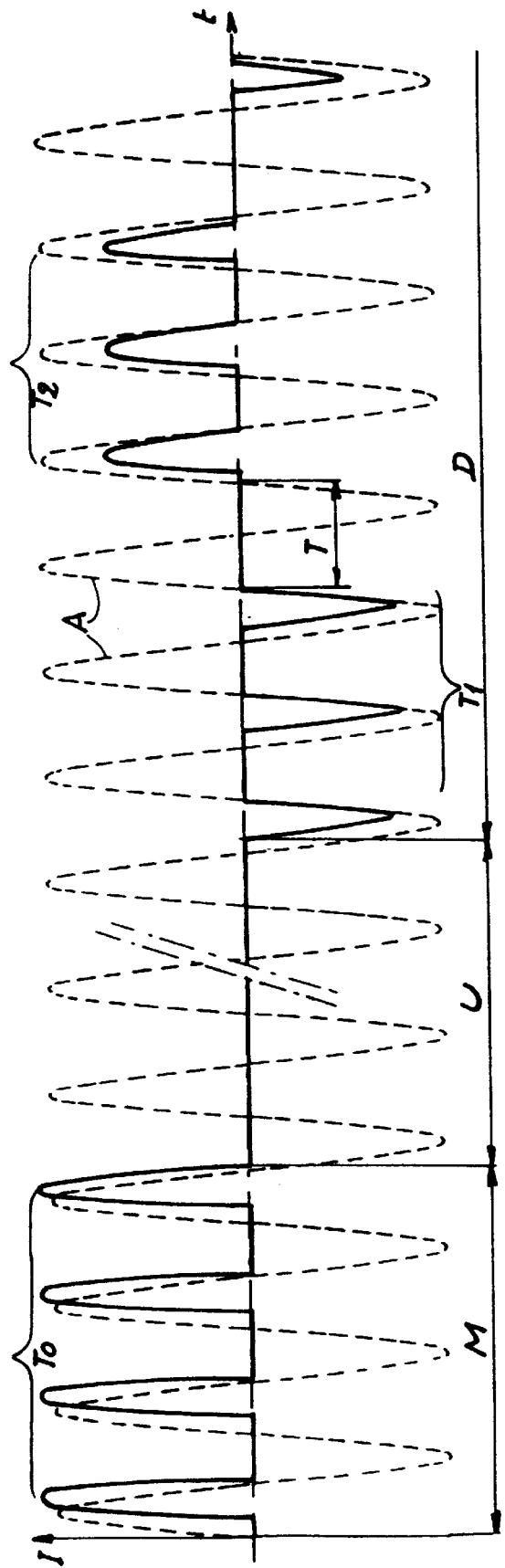
FIG. 5 is the curve of the electrical current absorbed by the coils on magnetization and at the start of demagnetization.
Figure 6:
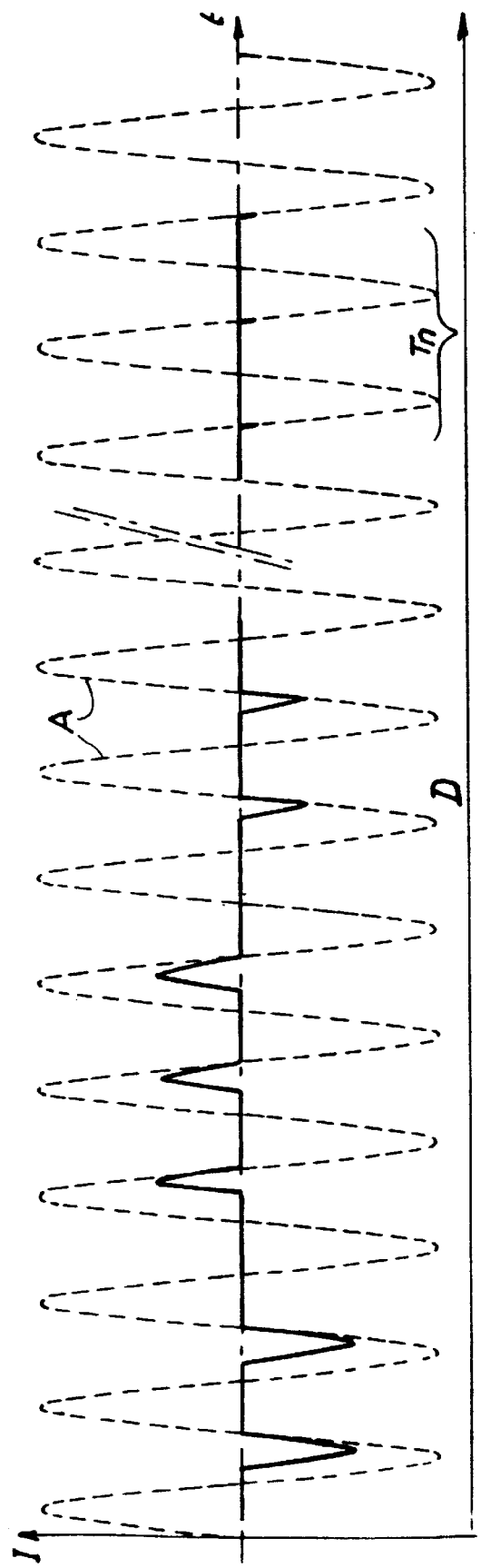
FIG. 6 shows the same curve as FIG. 5, but at the end of the demagnetization.

The thyristors 10 and 11 of the circuit 8 produce the pulse groups T1 . . . Tn from the alternating positive and negative waves of the incoming alternating-current voltage as shown in FIGS. 3 through 8. More specifically FIGS. 3 and 4 show how the incoming a-c current at voltage V and shown in dashed lines is clipped, letting pass the voltages shown in solid lines for a magnetization cycle M, use cycle U, and demagnetization cycle D. FIGS. 5 and 6 show the same thing but plotting current instead of voltage against time. Thus presuming the incoming line current has a frequency of 50 Hz each pulse can have a maximum duration of 10 millisec with 20 millisec between succeeding pulses. The current of the first pulses can be as much as 300 amp without problems. Thus each pulse is at least twice as long as the space between it and the adjacent pulse or pulses.

The pulse group To represents the pulses used to magnetize. This group To comprises four pulses of the same positive sign clipped out of four succeeding positive waves of the incoming a-c voltage.

Figure 7:
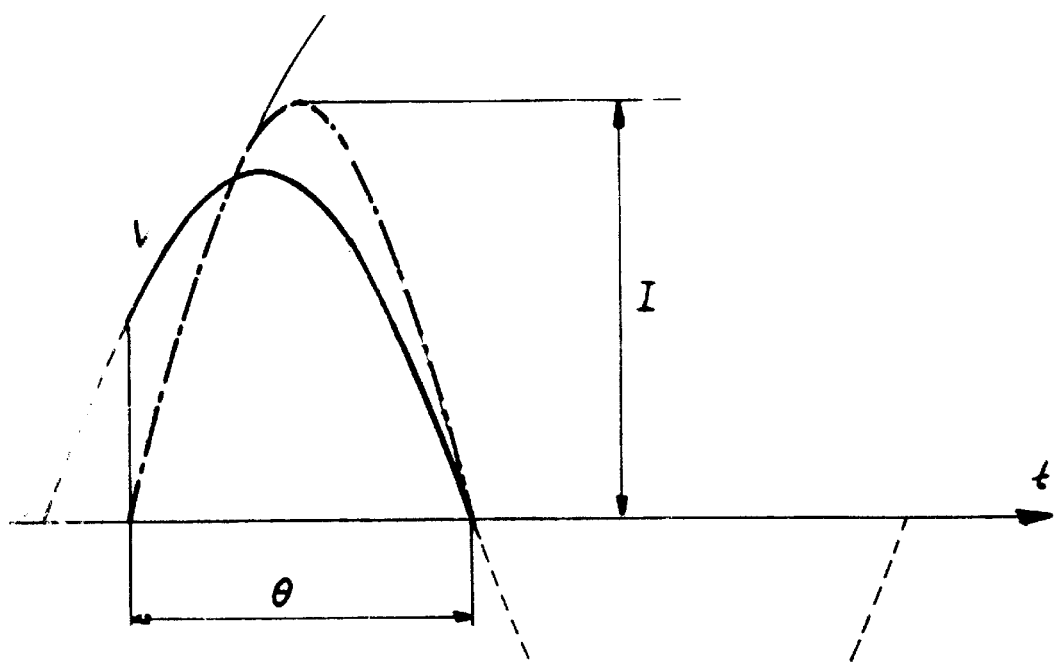
FIG. 7 is a graph showing the evolution of the current and voltage for a single pulse when the opening angle of the thyristor controlling this pulse is large.
Figure 8:
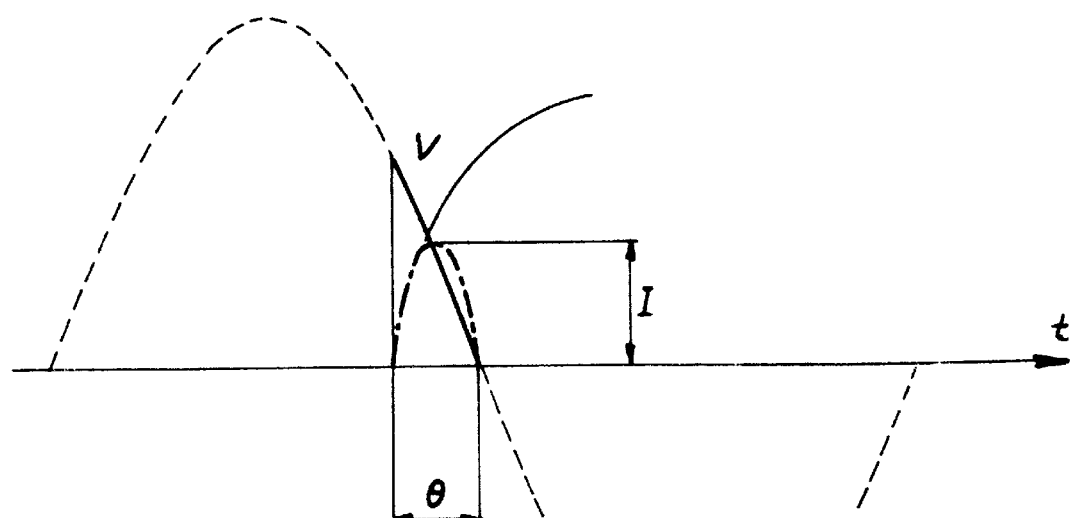
FIG. 8 is a graph like FIG. 7 but showing a smaller opening angle of the thyristor.

FIGS. 7 and 8 show how the thyristors 10 and 11 function during operation of the system of this invention. More particularly, FIG. 7 shows for a single pulse the evolution of the voltage V and the current I as the opening angle θ of the thyristor 10 or 11 is big, which corresponds to the first pulse groups during demagnetization. FIG. 8 shows in the same manner the evolution of the voltage V and current I when the opening angle θ of the thyristor 10 or 11 is small, that is at the end of the demagnetization process. Or course intermediate values are possible.

As is obvious the invention is not limited to this sole method of carrying out the process of demagnetization that has been described above. On the contrary the invention includes everything within the scope of the claims, for instance:

a different number of pulses in each pulse group,
 changing the frequency from that of the supply, for instance using every second or third pulse to get a much lower frequency,
 providing between succeeding pulse groups a time of no energization of the coils 4 equal to more than the time between succeeding pulses from the source 9,
 use of the process a predetermined total number of pulses and a regular scheme defining the decrease in pulse size,
 by applying the principles of this invention to the demagnetization of any other electropermanent magnet regardless of the number of magnets and the particular construction of these magnets and their coils.

We claim:

1. A method of holding a workpiece during machining with a holder having a plurality of magnetizable bodies each surrounded by a respective coil, the method comprising the steps of:

magnetizing the body by passing through the coil a series of electric pulses of the same current and polarity and setting the workpiece on the body;

retaining the workpiece on the body with magnetism imparted to the body by the series of pulses;

demagnetizing the body by passing through the coil a succession of groups of pulses, the pulses of each group being of the same polarity, the polarity of each group of pulses being opposite that of the preceding group, and the current of the pulses of each group being less than that of the pulses of the preceding group; and separating the workpiece from the demagnetized body.

2. The workpiece-holding method defined in claim 1 wherein each group has 2 to 8 identical pulses.

3. The workpiece-holding method defined in claim 1 wherein the pulses are formed by clipping an incoming alternating-current line voltage.

4. The workpiece-holding method defined in claim 3 wherein the pulses succeed each other at a frequency equal to a frequency of the incoming alternating-current line voltage.

5. The workpiece-holding method defined in claim 3 wherein the pulses succeed each other at a frequency equal to a frequency of the incoming alternating-current line voltage divided by a whole number greater than 1.

6. The workpiece-holding method defined in claim 3 wherein a spacing between succeeding pulse groups is equal to a whole-number multiple of a period of the incoming alternating-current line voltage.

7. The workpiece-holding method defined in claim 1 wherein the current of the pulse groups decreases regularly.

8. The workpiece-holding method defined in claim 1, further comprising the step after the step of separating of remagnetizing the body by passing through the coil a series of pulses of the same current and polarity.

9. A holding system energizable by alternating-current line voltage and comprising:

a plurality of magnetizable bodies;

respective low-resistance coils surrounding the bodies;

a supply circuit including a pair of oppositely connected thyristors receiving the line voltage, connected to the coils, and having respective control gates; and control means connected to the gates for passing through the coil a succession of groups of pulses, the pulses of each group being of the same polarity, the polarity of each group of pulses being opposite that of the preceding group, and the current of the pulses of each group being less than that of the pulses of the preceding group.

10. The holding system defined in claim 9, further comprising:

a ferromagnetic plate carrying a plurality of the bodies each with its own such coil;

each body being formed by a permanently magnetizable aluminum-nickel-cobalt element and a ferromagnetic pole piece; and a plurality of ferromagnetic elements between the bodies and forming with the pole pieces a support surface.

* * * * *